July 27, 1926.

A. AASEN 1,593,815

LOCKING DEVICE FOR AUTOMOBILES

Filed May 19, 1925

2 Sheets-Sheet 1

WITNESSES

Lawrence D. Mankin

INVENTOR
Axel Aasen,
BY
ATTORNEYS

July 27, 1926.
A. AASEN
1,593,815
LOCKING DEVICE FOR AUTOMOBILES
Filed May 19, 1925  2 Sheets-Sheet 2
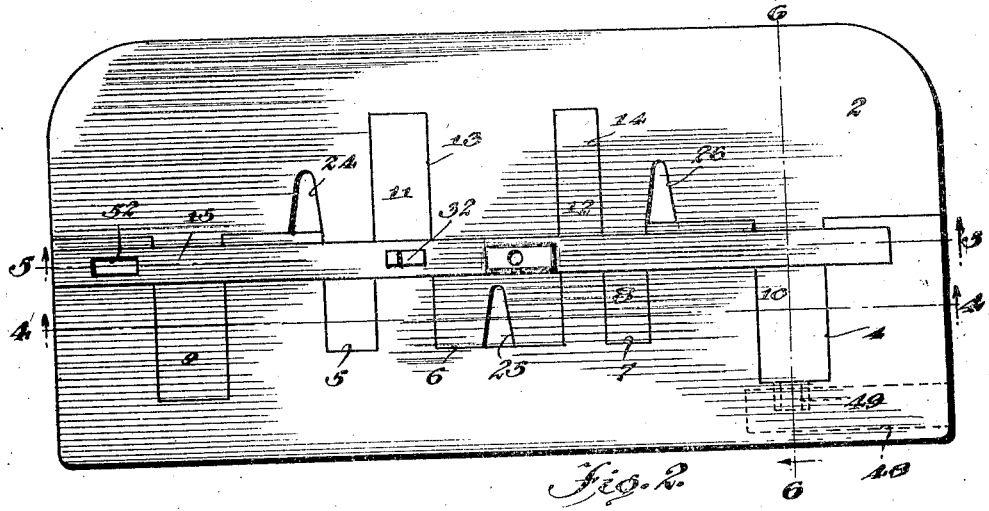
Fig. 2.
Fig. 3.
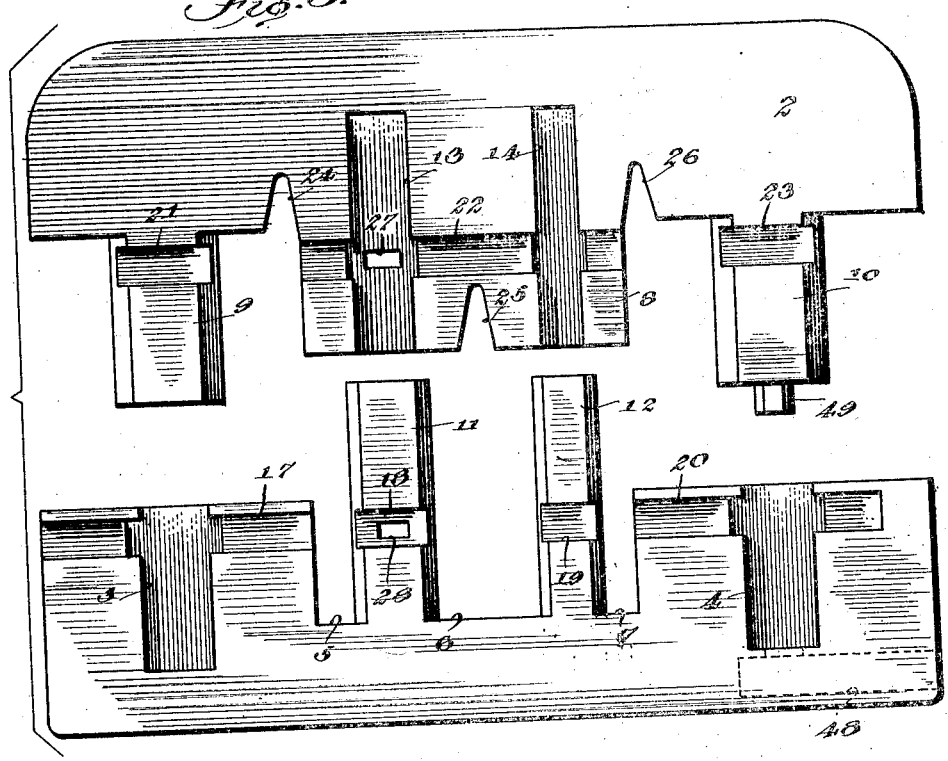
INVENTOR
Axel Aasen,
BY
ATTORNEYS
WITNESSES Patented July 27, 1926.

1,593,815

UNITED STATES PATENT OFFICE.

AXEL AASEN, OF PORTLAND, OREGON.

LOCKING DEVICE FOR AUTOMOBILES.

Application filed May 19, 1925. Serial No. 31,395.

My invention relates to improvements in devices for holding the controlling levers of an automobile against movement from certain positions, and it consists in the combinations, constructions and arrangements herein described and claimed.

An object of the invention is the provision of a simple, reliable and quickly attachable and detachable device having means for obstructing movement of a plurality of controlling levers of an automobile of a well known type of construction.

A further object of the invention is the provision of a locking device of the character described which is adapted to hold the controlling levers of the automobile in such position that the automobile cannot be towed or moved under its own power until the locking device has been disengaged from the controlling levers.

A further object of the invention is the provision of a locking device which comprises a plurality of interengaging sections for obstructing movement of the controlling levers and an improved and highly efficient means for holding said sections engaged with one another.

Other objects and advantages of the invention will be apparent from the following description, considered in conjunction with the accompanying drawing, in which—

Figure 1:
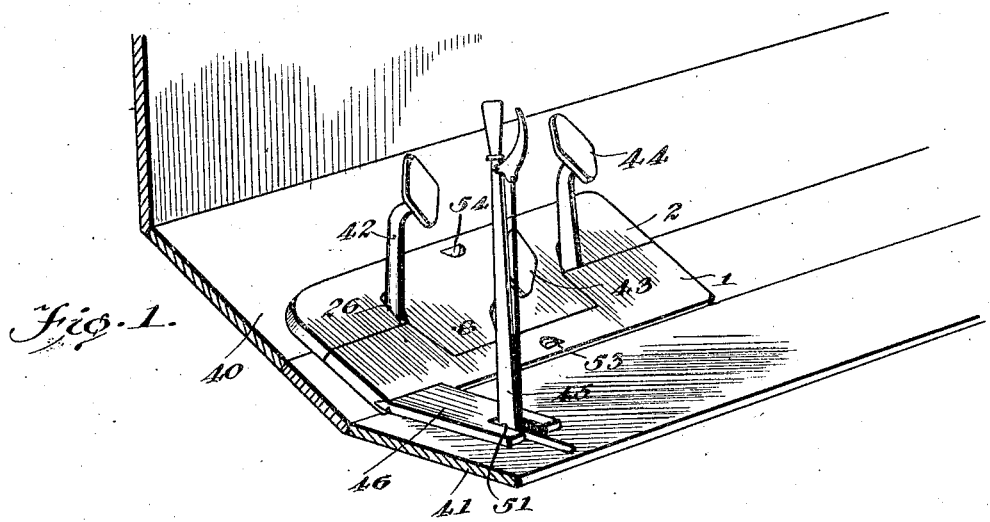
Figure 4:
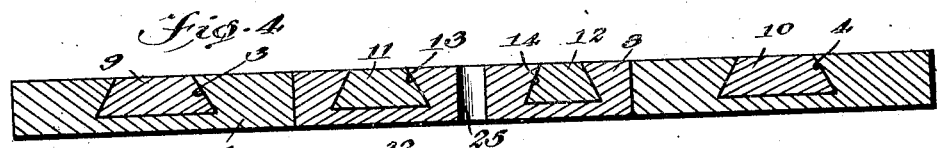
Figure 5:
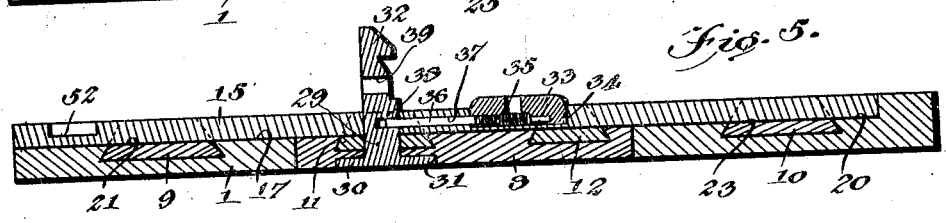
Figure 6:
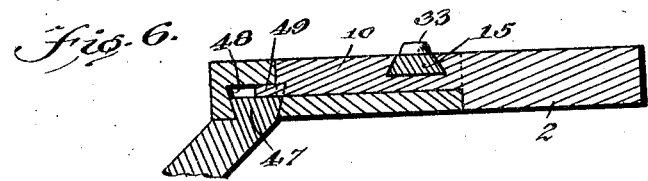
Figure 7:
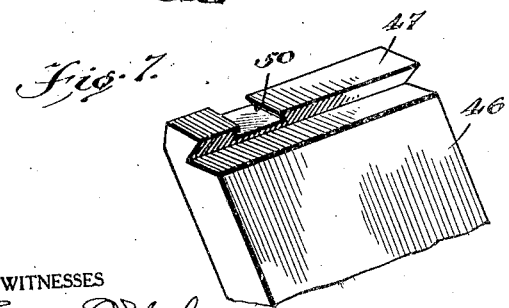
Figure 8:
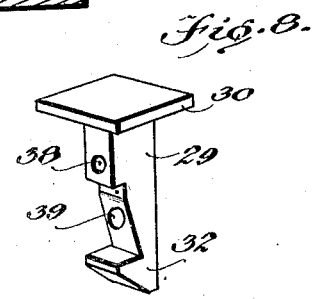

Figure 1 is a perspective view showing the improved locking device applied to the controlling levers of an automobile, Figure 2 is a plan view of the two main plate sections of the locking device as they appear when locked together and as disposed with the normally lower faces thereof uppermost, Figure 3 is a view similar to Figure 2 showing the two main sections separated from each other, the locking bar for holding the two main sections locked together being omitted, Figure 4 is a section along the line 4—4 of Fig. 2, Figure 5 is a section along the line 5—5 of Fig. 2, Figure 6 is a section along the line 6—6 of Fig. 2, Figure 7 is a fragmentary perspective view through the device showing a third or auxiliary plate section which is adapted to obstruct movement of the emergency brake lever of the automobile toward an operative position, Figure 8 is a perspective view of the combined keeper and actuator for the locking bar for holding the two main sections of the locking device locked together.

The improved locking device comprises a pair of main plate sections 1 and 2 respectively. The section 1 is formed with dovetailed grooves 3, 4 respectively extending in the normally lower face of end portions of the section 1 from the inner side edge of the section 1 toward the opposite side edge of the section 1. The middle portion of the section 1 is cut away as indicated at 5—6—7 to receive the extending middle portion 8 of the section 2 when dovetail tongues 9 and 10 which extend from the inner side edge of end portion of the section 2 are received in the dove-tail grooves 3 and 4 respectively and dove-tailed tongues 11 and 12 which extend from the inner wall of the cut away or re-entrant portion at 5, 6, 7 of the section 1 are received in dove-tail grooves 13 and 14 respectively in the normally lower face of the middle portion of the section 2. A dovetail locking bar 15 for holding the sections 1 and 2 locked together in engagement with each other as shown in Figures 1 and 2 is slidable in the transverse dove-tail groove which comprises portions 17, 18, 19 and 20 extending transversely across one end portion of the section 1, the tongue 11, the tongue 12 and the other end portion of the section 1, respectively, in the normally lower face of the section 1 and other portions 21, 22 and 23 which extend across the tongue 9, the middle portion 8 and the tongue 10 of the sections 1 and 2. The portions 21, 22 and 23 of the transverse dove-tail groove are in alignment with one another. The portions 17, 18, 19 and 20 of the transverse dove-tail groove also are in alignment with one another. The portions of the transverse dove-tail groove in the lower face of the section 2 also will be in alignment with the portions of the same transverse dove-tail groove in the lower face of the section 1 when the sections are engaged with each other and the tongues 9, 11, 12 and 10 are received in and engage the dove-tail grooves 3, 13, 14, and 4, respectively. The dove-tail locking bar 15 may then be slid longitudinally to and from position in the transverse groove to hold the sections 1 and 2 in engagement with each other and against movement from the position shown in Figure 2 to the position shown in Figure 3.

Vertical slots or apertures 24, 25 and 26 respectively are provided between adjacent edges of the sections 1 and 2 when the sections 1 and 2 are locked together, these vertical slots being shown as notches in the inner side edge of the section 2. The purpose of the vertical slots 24, 25 and 26 will be presently stated.

The section 2 is formed with a vertical opening 27 in the bottom of the intersecting portions of the dove-tail groove 13 and the transverse dove-tail groove. The section 1 is formed with a vertical opening 28 in the portion of the transverse dove-tail groove which extends across the tongue 11. The openings 27 and 28 will be in vertical alignment when the sections 1 and 2 are engaged with each other and the tongue 11 is received in the groove 13. A fastening post 29 has an enlarged head portion 30 adapted to be received in an enlarged upper end portion 31 of the opening 27 when the post 29 has been inserted in the aligned openings 27 and 28 as best seen in Figure 5. The post 29 then extends beyond the normally lower face of the section 1, the lower end of the post being formed as a hook as indicated at 32. A locking mechanism 33 of any suitable known type of construction is set in a socket 34 in the locking bar 15 and has a key hole 35 in which a suitable key may be inserted and manipulated to actuate an axially movable bolt 36 which is slidable in a bore 37 in the locking bar 15. The lock bolt 36 can be moved as a result of manipulation of the aforesaid key to and from position to engage with a recess or socket 38 in the locking post 29 and when in engagement with the socket 38 will hold the post 29 against displacement from position to extend through the aligned openings 27 and 28, as illustrated in Figure 5, whereby not only will the locking bar 15 be held against withdrawal from the transverse dove-tail groove but the sections 1 and 2 will be additionally held against movement from position to engage with each other as shown in Figure 2. If desired, the locking post 25 may be further held against withdrawal from position in the aligned openings 27 and 28 by means of an additional retaining member, not shown, which may be the shackle of a padlock projected through a transverse opening 39 in the extending lower end portion of the locking post.

From the foregoing description of the various parts of the device, the operation thereof may be readily understood. The locking device is intended for use with the controlling levers of an automobile of a well known type of construction. An automobile of that type has a floor comprising an inclined portion 40 and a horizontal portion 41 at the rear of the inclined portion. A clutch lever 42, a reverse lever 43 and a brake lever 44 protrude above the floor from slots in the inclined portion 40 of the floor of the automobile and are movable fore and aft to control the operation of the automobile. The plate sections 1 and 2 of the locking device are adapted to be engaged with each other and to be locked together by the hereinbefore described means so that the clutch lever 42 will extend through the aperture 26, the reverse lever 43 will extend through the aperture 25 and the brake lever 44 will extend through the aperture 24. Figure 1 illustrates the position of the levers 42, 43 and 44 and the apertures 26, 25 and 24 respectively in the sections 1 and 2 of the locking device and it is obvious that movement of these controlling levers from the position shown in Figure 1 will be obstructed when the plate sections 1 and 2 are locked together. An automobile of the type referred to also has an emergency brake lever 45 which extends through a slot in the horizontal portion 41 of the floor and has fore and aft swinging movement. A third plate section of the locking device is indicated at 46 and has an integral transversely extending dove-tail tongue portion 47 at one end thereof for engagement with a dove-tail groove 48 in the normally upper face of the plate section 1, the lower face of the dove-tail tongue 47 being beveled as best seen in Figure 7 so that the plate section 46 will rest flatwise on the horizontal portion 41 of the floor of the automobile when the tongue 47 is received in the dove-tail groove 48. A dove-tail locking extension 49 on the end of the tongue 10 will enter a dove-tail slot 50 in the tongue 47 when the plates 1 and 46 are arranged as shown in Figure 1 with the tongue 47 in the dove-tail groove 48 and the plates 1 and 2 are placed in engagement with each other so that the tongue 10 enters the dove-tail groove 4. It therefore will be obvious that the plate 46 will be locked to the plate 1 so long as the plates 1 and 2 are locked together by the locking means which has been described in the foregoing. The plate 46 has a slot 51 for engaging with the emergency brake lever 45 to hold the latter in its rearwardly swung position and against movement to inoperative position when the plates 46, 1 and 2 are arranged on the floor of the automobile in association with the controlling levers 45, 42, 23 and 44 as shown in Figure 1. The brake lever 44 and the emergency brake lever 45 will be held in operative positions and against movement to inoperative positions while the clutch lever 42 and the reverse lever 43 will be held in neutral positions. Therefore, theft or unauthorized use of the automobile will be prevented so long as the locking device is in place on the floor of the automobile and in association with the controlling levers as shown in Figure 1.

The post 29 may be used to effect movement of the locking bar 15 from position in the transverse dove-tail groove after the post 29 has been withdrawn from position in the aligned openings 28 and 29 and it is desired to separate the sections 1 and 2 of the locking device to release the controlling levers. To this end, the hook portion 32 of the locking post is placed in engagement with the recess 52 in the locking bar 15 and a pull on the post 29 will cause withdrawal of the locking bar from the transverse dove-tail groove. The sections 1 and 2 may be provided with finger holds as indicated at 53 and 54 respectively for convenience in manipulating the sections to separate them after they have been released from the locking post 29 and the locking bar 15. When the device is arranged in association with the controlling levers as hereinbefore described, the key hole 35 will be at the lower side of the device but the connected together sections of the device may be raised while in engagement with the respective controlling levers and without releasing the controlling levers for movement from the positions shown in Figure 1 to the height above the floor required to permit a key for operating the lock bolt 36 to be extended underneath the locking device and inserted in the key hole opening.

I claim:—

1. A lock of the character described comprising a pair of plate sections having extending tongues and having grooves, the grooves of each section being adapted to receive the tongues of the other section when said sections are disposed in edgewise contiguous relation, said sections being cooperatively formed to provide apertures at the meeting edges of said sections for the reception of controlling levers of an automobile, said grooves and said tongues being of dove-tail shape in cross section, said sections being cooperatively formed to provide a transverse dove-tail groove including portions extending transversely in said tongues, a dove-tail locking bar slidable to and from position in said transverse dove-tail groove to hold said tongues against withdrawal from said first named grooves, said sections being formed with aligned openings extending vertically through one of said sections, through a tongue of the other section and through said locking bar, and a locking post insertable in said aligned vertical openings to hold said locking bar against withdrawal.

2. A lock of the character described comprising a pair of plate sections having extending tongues and having grooves, the grooves of each section being adapted to receive the tongues of the other section when said sections are disposed in edgewise contiguous relation, said sections being cooperatively formed to provide apertures at the meeting edges of said sections for the reception of controlling levers of an automobile, said grooves and said tongues being of dove-tail shape in cross section, said sections being cooperatively formed to provide a transverse dove-tail groove including portions extending transversely in said tongues, a dove-tail locking bar slidable to and from position in said transverse dove-tail groove to hold said tongues against withdrawal from said first named grooves, said sections being formed with aligned openings extending vertically through one of said sections, through a tongue of the other section and through said locking bar, and a locking post insertable in said aligned vertical openings to hold said locking bar against withdrawal, said locking post having a hooked end portion adapted for engagement with a cavity in said locking bar and operable to withdraw said locking bar from said transverse groove.

3. A lock of the character described comprising a pair of plate sections having extending tongues, said tongues being of dove-tail shape in cross sectional contour, each section having dove-tail grooves for the reception of the tongues of the other section, said sections being cooperatively formed to provide apertures at the meeting edges thereof for the reception of the clutch lever, the reverse lever and the brake lever, respectively, of an automobile, one of said plate sections having a dove-tail groove adjacent to its outer edge, and a third plate section having a tongue engageable with said last named dove-tail groove and having a slotted outer end portion engageable with the emergency brake lever to prevent movement of the latter toward inoperative position.

4. A lock of the character described comprising a pair of plate sections having extending tongues, said tongues being of dove-tail shape in cross sectional contour, each section having dove-tail grooves for the reception of the tongues of the other section, said sections being cooperatively formed to provide apertures at the meeting edges thereof for the reception of the clutch lever, the reverse lever and the brake lever, respectively, of an automobile, one of said plate sections having a dove-tail groove adjacent to its outer edge, the other of said sections having an extension at the end of one of the tongues thereof adapted to extend transversely across said last named dove-tail groove when said sections are in contiguous relation edgewise, and a third plate section having a tongue portion at one end engageable with said last named dove-tail groove, the tongue portion of said third plate section having a transverse dove-tail groove for receiving the extension on the end of said tongue of one of the first named plate sections whereby said third plate section will be locked to said first named sections when said first named sections are in edgewise contiguous relation, said third plate section having a slotted outer end portion engageable with the emergency brake lever to hold the latter against movement to inoperative position.

5. A lock of the character described comprising a pair of plate sections having extending tongues and having grooves, the grooves of each section being adapted to receive the tongues of the other section when said sections are disposed in edgewise contiguous relation, said sections being cooperatively formed to produce apertures at the meeting edges of said sections for the reception of controlling levers of an automobile, said sections also being cooperatively formed to produce a transverse groove including portions extending transversely in and across said tongues, a locking bar slidable to and from position in said transverse groove to hold said tongues against withdrawal from said first named grooves and locking means for releasably holding said locking bar in place in said transverse groove.

AXEL AASEN.